UNITED STATES PATENT OFFICE.

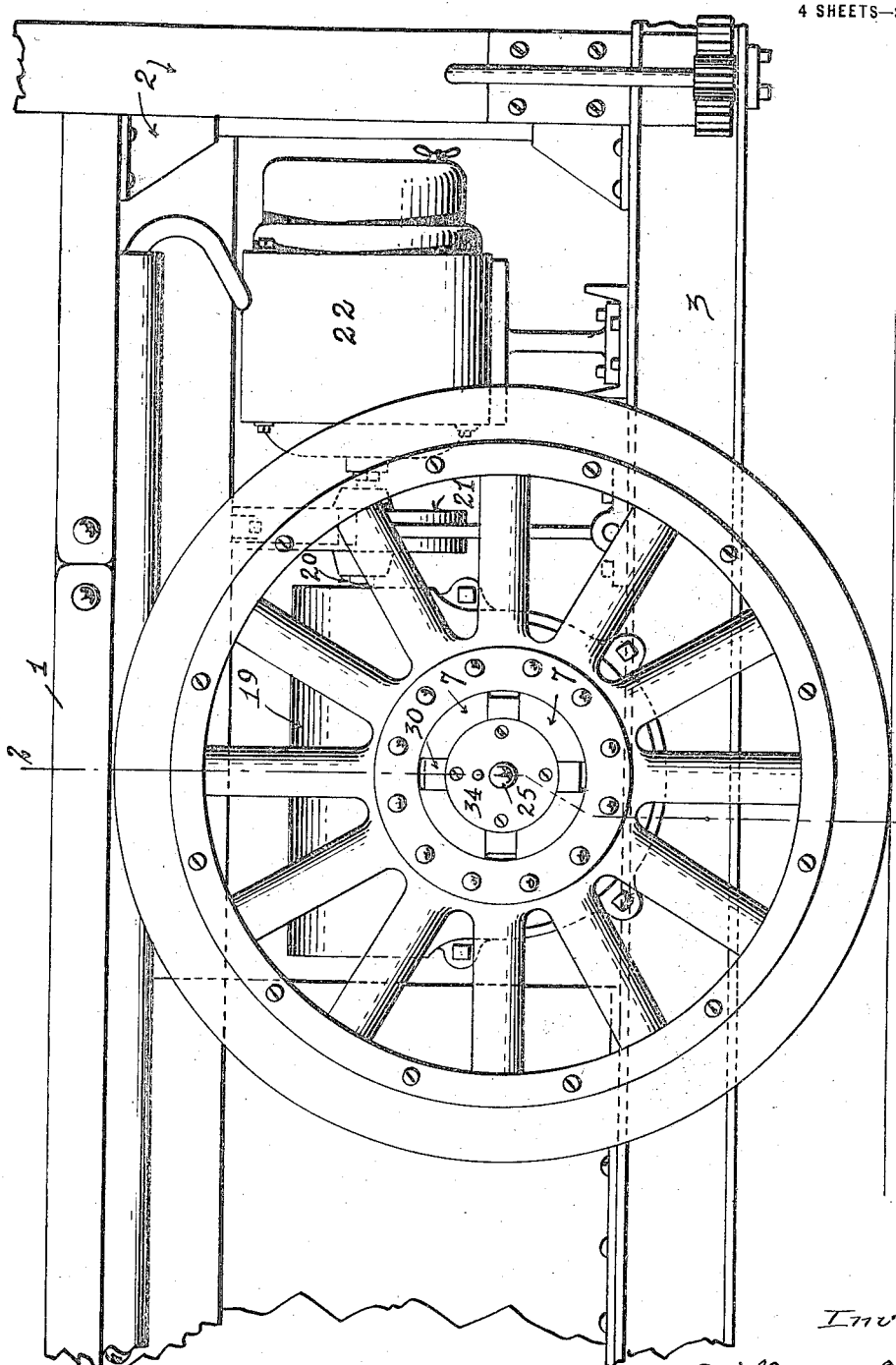

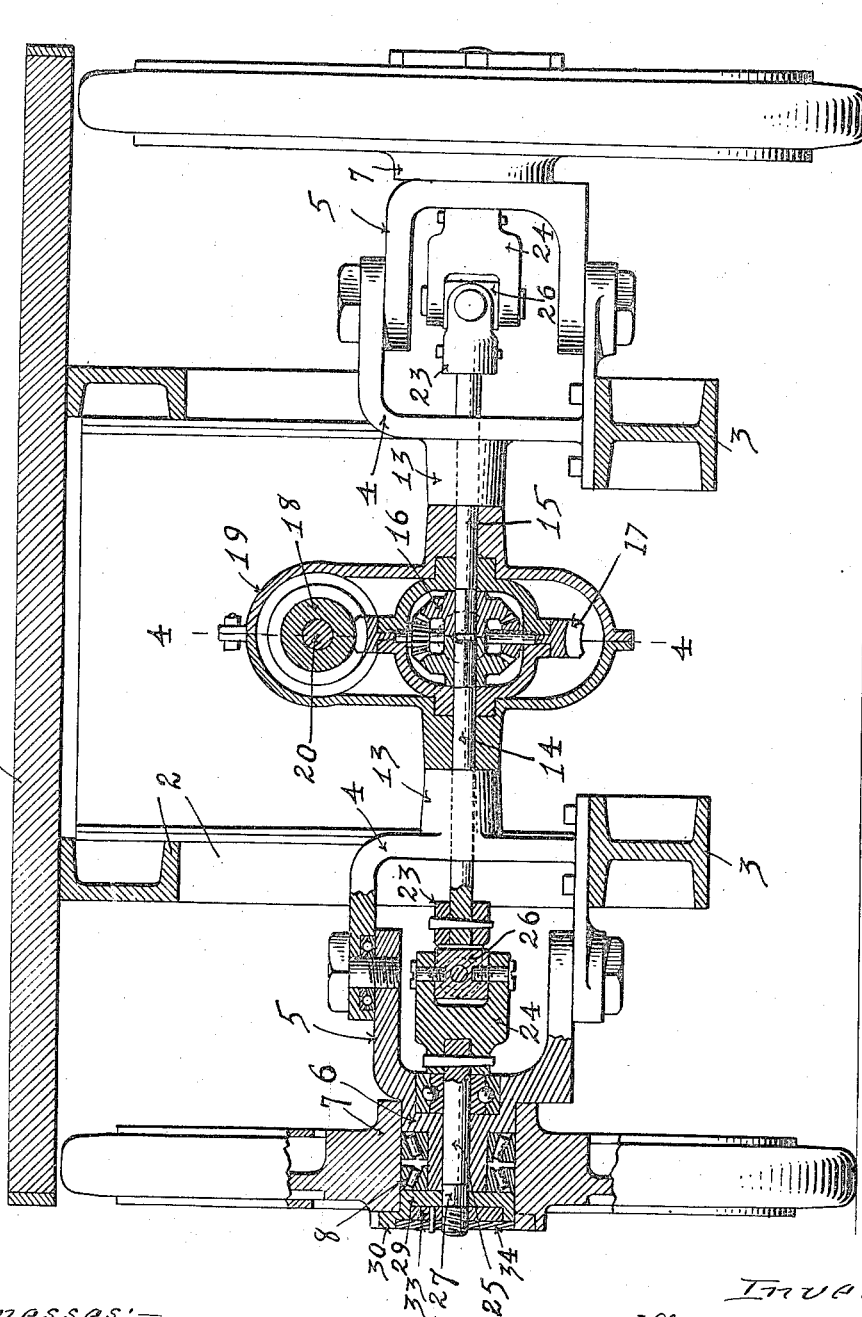

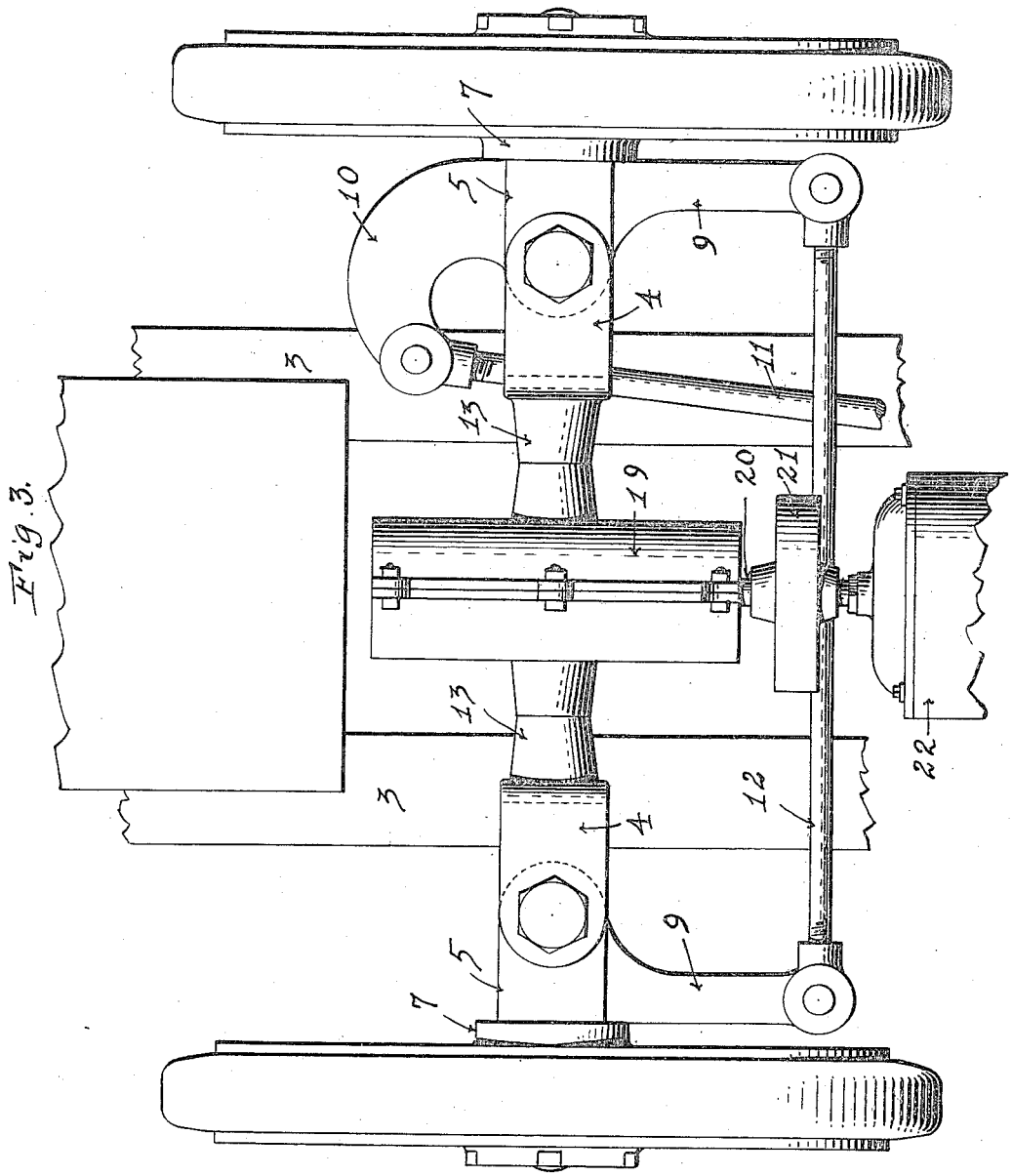

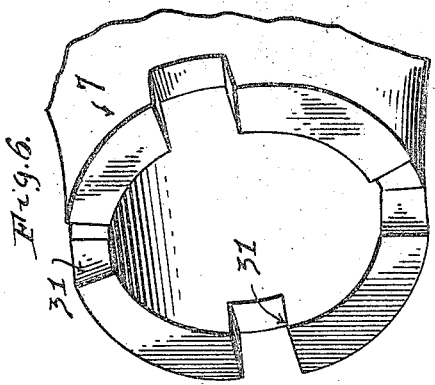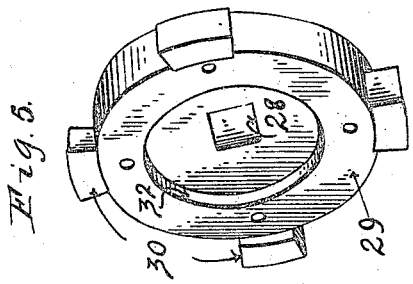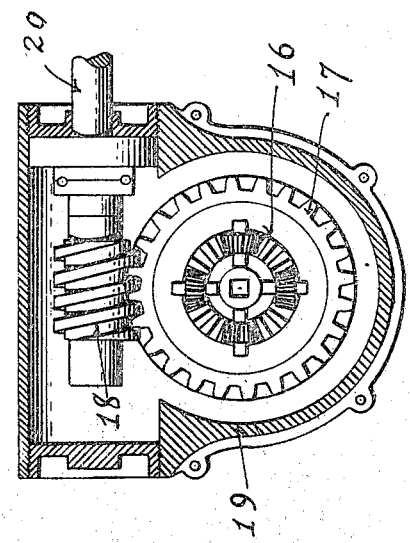

WILLIAM C. CARR, OF BUFFALO, NEW YORK.

MOTOR-TRUCK.

1,237,867.  Specification of Letters Patent.  Patented Aug. 21, 1917.

Application filed October 18, 1913. Serial No. 796,013.

*To all whom it may concern:*

Be it known that I, WILLIAM C. CARR, a citizen of the United States, residing at Buffalo, in the county of Erie and State of New York, have invented certain new and useful Improvements in Motor-Trucks, of which the following is a specification.

My invention relates to improvements in motor trucks, and more particularly to motor-driven trucks of the platform type.

While my invention is applicable to other forms of motor trucks, it is especially applicable to the trucks of said type and the particular requirements and conditions to which they are subjected.

The object of my invention is to provide an improved frame and platform construction, improved driving connections and mounting, and improved hub construction and connections which will adapt the general features of a motor truck to the requirements and rough handling of a platform truck, in which one or both pairs of wheels are steered and in which one or both pairs of wheels are motor driven. The novel features of my invention which attain these ends will be evident from the following specification and from the accompanying drawings in which,—

Figure 1 is a side elevation of one-half of a truck provided with my invention.

Fig. 2 is a transverse vertical section upon the line 2—2 of Fig. 1.

Fig. 3 is a plan view with the platform removed.

Fig. 4 is a section upon the line 4—4 of Fig. 2.

Fig. 5 is a perspective of my hub-and-shaft locking plate, hereafter more fully described.

Fig. 6 is a detail perspective of the portion of the hub into which said locking plate fits.

The platform 1 is carried upon a channel- and angle-iron frame 2, which is supported upon I-beams 3. Bolted to the upper surfaces of I-beams 3 are the fixed members 4 of the steering knuckles. The platform 1 lies in a plane just above the wheels and its edges or sides are substantially in vertical plane with the faces of the hubs, so that the truck may be brought up close to a platform or car to or from which a load is to be taken; and the frame being underhung to the fixed members 4 of the steering knuckles, mounting of the motor and driving mechanism substantially inside of and protected by the frame is made possible. This improved construction is of large importance, because trucks of this type used in railway stations, freight houses, on docks and in factories are subjected to such rough handling that, unless the motor and connections are thoroughly protected, they are liable to be broken or otherwise put out of use. The movable members 5 of the steering knuckles, pivoted to the fixed members 4 to swing in horizontal plane in the usual manner, have axles 6 upon which the hubs 7 of the wheels are mounted with antifriction bearings 8. The members 5 have horizontally extending arms 9 which are pivotally connected to a tie-rod 12, in the usual manner; and to one of the members 5 is secured a curved lever 10 to which is pivoted a steering-rod 11.

The fixed members 4 of the steering knuckles are provided with hub-extensions 13 which are bored to form bearings for the driving-shafts 14 and 15. The shafts 14 and 15 are connected in the usual manner to differential gearing 16, the driving-gear 17 of which engages a worm 18 which is pivotally carried in the casing 19, which casing is pivotally carried upon the shafts 14 and 15 between the hub-extensions 13. The shaft 20 of the worm 18 is connected through a clutch 21 to the shaft of a motor 22.

To the outer ends of the shafts 14 and 15 are keyed bifurcated members 23 of universal couplings. The opposite bifurcated members 24 are keyed to shafts 25 which are journaled within the axles 6 and which are connected to the hubs of the wheels in the manner hereafter described. The members 23 and 24 of the universal couplings are pivoted quadrantially to pivot-blocks 26 in the well-known manner.

The shafts 25 are secured to the hubs 7 in the following manner: The shafts 25 have squared portions 27 over which fit the squared openings 28 of the locking-plates, clearly shown in Fig. 5. These locking-plates have cylindrical bodies 29 which fit within the hubs 7 and have radially-extending lugs 30 which fit into corresponding lug-notches 31 in the faces of the hubs 7. These locking-plates are cylindrically recessed upon their outer faces as shown at 32, Fig. 5, to receive nuts 33 (see Fig. 2), and these nuts 33 are threaded onto the ends of the shafts 25. The lugs 30 project outwardly from the plane of the face of the cylindrical portions 29, so that the faces of these lugs 30 are flush with the faces of the hubs 7. Threaded onto the shafts 25, fitting within the lugs 30, and setting up against the faces of the cylindrical portions of the said locking-plates are lock-nuts 34, which, when in place, are pinned or screw-held to the faces of said locking-plates.

The operation need not be described further than to note that, with the apparatus described, steering is effected in the usual manner without any interference with or diminution of the application of power to the wheels to any appreciable extent. The universal couplings and the differential gearing coöperate to secure continuous application of power without strain upon the parts of the machine, and the construction is such as to permit maximum strength of parts at the points where the same is required. It is also to be noted that, by the construction shown, the hubs of the wheels project but a trifle beyond the outer plane of the wheels and but a trifle beyond the side-edges of the platform. This not only protects the hubs and connecting parts against injury, but permits the truck to be run close beside a platform or other object for loading or unloading.

Having thus described my invention, I claim:—

1. In a truck, live axles having squared driving ends provided with threaded extensions, wheels having a bearing on said axles and each carrying a female clutch member provided with recesses, a male clutch member for each wheel having arms interlocking with the recesses of said female member to form a flush surface with the female member, said male member having a recess, and members threaded onto the extensions of the axles and setting into said last mentioned recesses flush with the surfaces of the clutch members and locking the latter together to form a substantially flush hub construction.

2. In a truck, live axles having squared driving ends provided with threaded extensions, wheels having a bearing on said axles and each carrying a female clutch member provided with recesses, a male clutch member for each wheel having arms interlocking with the recesses of said female member to form a flush surface with the female member, said male member having a recess, members threaded onto the extensions of the axles and setting into said last mentioned recesses flush with the surfaces of the clutch members and locking the latter together to form a substantially flush hub construction, and means for locking said last named members to the male clutch members.

In testimony whereof I have hereunto set my hand in the presence of two witnesses.

WILLIAM C. CARR.

Witnesses:
E. L. KLEINDINST,
A. H. THEES.